(12) United States Patent
Rowe et al.

(10) Patent No.: US 7,160,343 B2
(45) Date of Patent: Jan. 9, 2007

(54) SYSTEMS AND METHODS FOR CARBON MONOXIDE CLEAN-UP

(75) Inventors: Julia Margaret Rowe, Wallingford (GB); Beverley Sowerby, Bath (GB)

(73) Assignee: General Motors Corporation, Detroit, MI (US)

( * ) Notice: Subject to any disclaimer, the term of this patent is extended or adjusted under 35 U.S.C. 154(b) by 503 days.

(21) Appl. No.: 10/440,020

(22) Filed: May 16, 2003

(65) Prior Publication Data

US 2004/0229091 A1   Nov. 18, 2004

(51) Int. Cl.
- B01J 8/04 (2006.01)
- C01B 3/24 (2006.01)
- C01B 3/32 (2006.01)
- C01J 3/84 (2006.01)

(52) U.S. Cl. ............... 48/198.3; 48/128; 48/214 A; 48/198.7; 48/197 R; 422/190; 422/211; 422/198

(58) Field of Classification Search ............ 429/218.2, 429/17, 22; 423/655; 48/61
See application file for complete search history.

(56) References Cited

U.S. PATENT DOCUMENTS

| | | | |
|---|---|---|---|
| 4,402,187 A * | 9/1983 | Golben et al. ............ 62/46.2 |
| 5,248,566 A * | 9/1993 | Kumar et al. ............ 429/19 |
| 5,527,632 A | 6/1996 | Gardner | |
| 5,702,838 A | 12/1997 | Yasumoto et al. | |
| 6,165,643 A | 12/2000 | Doyle et al. | |
| 6,195,999 B1 | 3/2001 | Arnold et al. | |
| 6,261,528 B1 | 7/2001 | Carrea et al. | |
| 6,342,198 B1 | 1/2002 | Zaluska et al. | |
| 6,379,645 B1 * | 4/2002 | Bucci et al. ............ 423/655 |
| 6,406,805 B1 | 6/2002 | James et al. | |
| 6,458,478 B1 | 10/2002 | Wang et al. | |
| 6,508,866 B1 * | 1/2003 | Golben ............ 96/146 |
| 6,790,247 B1 * | 9/2004 | Childress et al. ......... 48/198.6 |
| 2002/0127458 A1 | 9/2002 | Pratt et al. | |

* cited by examiner

Primary Examiner—Alexa Neckel
Assistant Examiner—Kaity Handal
(74) Attorney, Agent, or Firm—Dinsmore & Shohl LLP

(57) ABSTRACT

A fuel cell system comprises a fuel cell stack and a carbon monoxide clean-up system in communication with the fuel cell stack. The carbon monoxide cleanup system comprises a first water gas shift reactor, a first hydride heat exchanger, and a second water gas shift reactor. The first water gas shift reactor comprises a first water gas shift catalyst. The first hydride heat exchanger comprises a first metal hydride, and is in communication with the first water gas shift reactor. The second water gas shift reactor comprises a second water gas shift catalyst, and is in communication with the first heat exchanger. The first hydride heat exchanger, and the second water gas shift reactors are disposed such that a reactant stream may pass through the first water gas shift reactor prior to passing through the first heat exchanger, and then pass through the second water gas shift reactor.

24 Claims, 3 Drawing Sheets

SYSTEMS AND METHODS FOR CARBON MONOXIDE CLEAN-UP

BACKGROUND OF THE INVENTION

The present invention relates to integrated systems and methods for carbon monoxide clean up. More particularly, the present invention relates to carbon monoxide clean-up systems having water gas shift reactors and heat exchangers having metal hydrides therein and methods of removing carbon monoxide from a reactant stream employing such systems.

Hydrogen fuel cells have become an increasingly attractive source of power for a variety of applications. However, the storage, transportation, and delivery of hydrogen presents a number of difficulties. Thus, hydrogen fuel cell systems may be equipped with reforming systems for producing hydrogen from an alternate fuel source such as a hydrocarbon fuel. However, these reforming systems often require extensive carbon monoxide removal subsystems because hydrogen fuel cells are generally not tolerant of carbon monoxide. The subsystems add to the cost, complexity, and size of reforming systems.

Thus, there remains a need in the art for carbon monoxide clean-up systems that are more cost effective, less complex, and smaller.

SUMMARY OF THE INVENTION

This need is met by the present invention that provides carbon monoxide clean-up systems and methods of using the same. Additionally, fuel cell systems and vehicles are provided.

In accordance with an embodiment of the present invention, a device comprising a carbon monoxide clean-up system is provided. The carbon monoxide clean-up system comprises a first water gas shift reactor having a first water gas shift catalyst; a first hydride heat exchanger having a first metal hydride disposed therein; and a second water gas shift reactor having a second water gas shift catalyst. The first hydride heat exchanger is in communication with the first water gas shift reactor, and the first hydride heat exchanger is disposed such that a reactant stream may pass through the first water gas shift reactor prior to passing through the first heat exchanger. The second water gas shift reactor is in communication with the first heat exchanger, and the second water gas shift reactor is disposed such that the reactant stream may pass through the second water gas shift reactor after passing through the first heat exchanger. The first hydride heat exchanger may be disposed so that the reactant stream may again pass through the first hydride heat exchanger after passing through the second water gas shift reactor.

In accordance with an embodiment of the present invention, a method of removing carbon monoxide from a reactant stream is provided. The method comprises providing a carbon monoxide clean-up system and passing a reactant stream comprising carbon monoxide and hydrogen through the carbon monoxide clean-up system. The carbon monoxide clean-up system comprises: a first water gas shift reactor having at one least first water gas shift catalyst; a first hydride heat exchanger having a first metal hydride disposed therein; and a second water gas shift reactor having a second water gas shift catalyst. The first hydride heat exchanger is in communication with the first water gas shift reactor, and the second water gas shift reactor is in communication with the first heat exchanger.

The reactant stream may be passed through the first water gas shift reactor, and the first water gas shift reactor is configured such that the concentration of carbon monoxide in the reactant stream is reduced upon passage of the reactant stream through the first water gas shift reactor. The reactant stream may passed through the first hydride heat exchanger subsequent to passing the reactant stream through the first water gas shift reactor, and the first hydride heat exchanger is configured such that the first metal hydride is hydrided with the hydrogen and the concentration of hydrogen in the reactant stream is reduced upon passage of the reactant stream through the first hydride heat exchanger. The reactant stream may be passed through the second water gas shift reactor subsequent to passing the reactant stream through the first hydride heat exchanger, and the second water gas shift reactor is configured such that the concentration of carbon monoxide in the reactant stream is further reduced upon passage of the reactant stream through the second water gas shift reactor. The reactant stream is passed through the first hydride heat exchanger subsequent to passing the reactant stream through the second water gas shift reactor, and the first hydride heat exchanger is configured such that the first metal hydride is dehydrided and the concentration of hydrogen in the reactant stream is increased upon passage of the reactant stream through the first hydride heat exchanger.

The carbon monoxide clean-up system may further comprise: a second hydride heat exchanger having a second metal hydride disposed therein, wherein the second metal hydride heat exchanger is in communication with the second water gas shift reactor; and a third water gas shift reactor having a third water gas shift catalyst, wherein the third water gas shift reactor is in communication with the second hydride heat exchanger.

The reactant stream is passed through the first water gas shift reactor, and the first water gas shift reactor is configured such that the concentration of carbon monoxide in the reactant stream is reduced upon passage of the reactant stream through the first water gas shift reactor. The reactant stream is passed through the first hydride heat exchanger subsequent to passing the reactant stream through the first water gas shift reactor, and the first hydride heat exchanger is configured such that the first metal hydride is hydrided with the hydrogen and the concentration of hydrogen in the reactant stream is reduced upon passage of the reactant stream through the first hydride heat exchanger. The reactant stream is passed through the second water gas shift reactor subsequent to passing the reactant stream through the first hydride heat exchanger, and the second water gas shift reactor is configured such that the concentration of carbon monoxide in the reactant stream is further reduced upon passage of the reactant stream through the second water gas shift reactor.

The reactant stream is passed through the second hydride heat exchanger subsequent to passing the reactant stream through the second water gas shift reactor, and the second hydride heat exchanger is configured such that the second metal hydride is hydrided with the hydrogen and the concentration of hydrogen in the reactant stream is reduced upon passage of the reactant stream through the second hydride heat exchanger. The reactant stream is passed through the third water gas shift reactor subsequent to passing the reactant stream through the second hydride heat exchanger, and the third water gas shift reactor is configured such that the concentration of carbon monoxide in the reactant stream is further reduced upon passage of the reactant stream through the third water gas shift reactor. The reactant stream is passed through the second hydride heat exchanger subsequent to passing the reactant stream through the third water gas shift reactor, and the second hydride heat exchanger is configured such that the first metal hydride is dehydrided and the concentration of hydrogen in the reactant stream is increased upon passage of the reactant stream through the second hydride heat exchanger. The reactant stream is passed through the first hydride heat exchanger subsequent to passing the reactant stream through the second hydride heat exchanger, and the first hydride heat exchanger is configured such that the first metal hydride is dehydrided and the concentration of hydrogen in the reactant stream is increased upon passage of the reactant stream through the first hydride heat exchanger.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
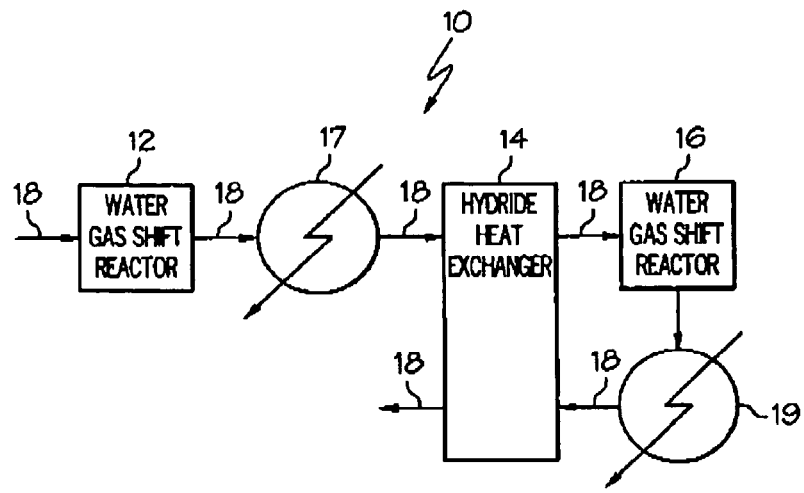
FIG. 1 is a schematic illustration of a carbon monoxide clean-up system in accordance with the present invention.

Referring to FIG. 1, a carbon monoxide clean-up system 10 in accordance with an embodiment of the present invention is illustrated. The carbon monoxide clean-up system comprises a first water gas shift reactor 12, a first hydride heat exchanger 14, and a second water gas shift reactor 16. The first hydride heat exchanger 14 is in communication with the first water gas shift reactor 12 and the second water gas shift reactor 16. A reactant stream 18 comprising carbon monoxide and hydrogen is provided to the carbon monoxide clean-up system 10, and the reactant stream passes through the carbon monoxide clean-up system 10.

The first water gas shift reactor 12 is any suitable water gas shift reactor having a first water gas shift catalyst. For example, the first water gas shift reactor 12 may be a monolith containing a first water gas shift catalyst. It will be understood that the first water gas shift reactor 12 may have more than one water gas shift catalyst. The reactant stream 18 passes through the first water gas shift reactor 12, and a standard water gas shift reaction takes place on the water gas shift catalyst. The water gas shift reaction is generally:

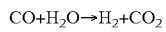

$CO+H_2O \rightarrow H_2+CO_2$

Thus, the first water gas shift reactor 12 is configured such that the concentration of carbon monoxide in the reactant stream is reduced.

The first hydride heat exchanger 14 is any suitable heat exchanger of any suitable configuration. For example, the first hydride heat exchanger 14 may be a tube type, coil type, or plate type heat exchanger. The first hydride heat exchanger 14 has a first metal hydride disposed therein. For purposes of defining and describing the present invention, "metal hydride" shall be understood as referring to an intermetallic compound capable of absorbing hydrogen. The first metal hydride may be any suitable metal hydride, and the first hydride heat exchanger 14 may be coated or filled with the metal hydride in any suitable manner. It will be understood that the first hydride heat exchanger 14 may alternatively have more than one metal hydride disposed therein.

The reactant stream 18 is passed through the first hydride heat exchanger 14 subsequent to passing through the first water gas shift reactor 12. The first metal hydride is selected such that hydrogen in the reactant stream is absorbed by the metal hydride at the temperature of the reactant stream 18 and at the partial pressure of hydrogen in the reactant stream 18, after passing through the first water gas shift reactor 12. Thus, the metal hydride becomes hydrided and the concentration of hydrogen in the reactant stream 18 is reduced. Generally, the metal hydride becomes fully hydrided for the given temperature and partial pressure of hydrogen of the reactant stream 18.

The metal hydride may be selected such that it absorbs hydrogen at a temperature between about 200° C. to about 350° C. More generally, the metal hydride is selected such that is absorbs hydrogen at a temperature between about 250° C. to about 300° C. The reactant stream 18 may be cooled after passing through the first water gas shift reactor 12 and prior to passing through the first hydride heat exchanger 14 because the water gas shift reaction is generally exothermic. Thus, the reactant stream 18 may be cooled to a suitable temperature at which the metal hydride may absorb hydrogen. The reactant stream 18 may be cooled in any suitable manner. For example, the reactant stream 18 may be cooled using a separate heat exchanger 17.

Suitable metal hydrides include those containing Ti, Mg, and Pd. For example, the metal hydride may be selected from metal hydrides of the $Mg_2Ni$ family. The metal hydrides may be doped with platinum group metals (PGM). Such PGM doped metal hydrides are described in U.S. Pat. No. 6,165,643, the disclosure of which is incorporated by reference herein. PGM doped metal hydrides may enhance the kinetics of the hydration/dehydration in the first hydride heat exchanger 14, and, thus, the size of the first hydride heat exchanger 14 may be reduced.

The second water gas shift reactor 16 is any suitable water gas shift reactor having a second water gas shift catalyst. It will be understood that that second water gas shift reactor 16 may have more than one water gas shift catalyst. The reactant stream 18 is passed through the second water gas shift reactor 16 subsequent to passing through the first hydride heat exchanger 14. A standard water gas shift reaction takes place on the second water gas shift catalyst, and the concentration of carbon monoxide in the reactant stream 18 is further reduced.

Once the reactant stream 18 has passed through the second water gas shift reactor 16, it is again passed through the first hydride heat exchanger 14. Because the reactant stream 18 is depleted of hydrogen prior to reentering the first hydride heat exchanger 14, the partial pressure of hydrogen in the reactant stream 18 has been reduced. Thus, the first metal hydride is dehydrided when the reactant stream 18 passes through the first hydride heat exchanger 14 after passing through the second water gas shift reactor 16, and the concentration of hydrogen in reactant stream 18 is increased. Additionally, the reactant stream 18 may be heated prior to passing through the first hydride heat exchanger 14 after exiting the second water gas shift reactor 16 in order to increase the rate at which the metal hydride is dehydrided. For example, the reactant stream 18 may be heated to a temperature between about 250° C. to about 450° C. More generally, the reactant stream 18 may be heated to a temperature between about 250° C. to about 350° C. The reactant stream 18 may be heated in any suitable manner. For example, the reactant stream 18 may be heated using a heat exchanger 19.

The first and second water gas shift catalysts may be any suitable water gas shift catalysts. Generally, the first and second water gas shift catalysts are selected such that an operational temperature of the first and second water gas shift catalysts and a hydridable temperature of the first metal hydride are approximately equal. For purposes of defining and describing the present invention "operational temperature" shall be understood as referring to a temperature range at which a given water gas shift catalyst may operate. For purposes of defining and describing the present invention "hydridable temperature" shall be understood as referring to a temperature range in which a given metal hydride may be hydrided. For example, the first metal hydride may absorb hydrogen in a temperature range of about 200° C. to about 350° C. Thus, standard low temperature water gas shift catalysts, such as Cu—Al—Zn, may be used as the first and second water gas shift catalyst. Other water gas shift catalysts include Pd/Fe formulations and Pt/Ce formulations.

Once the reactant stream 18 has passed through the first hydride heat exchanger 14 after exiting the second water gas shift reactor, the reactant stream 18 generally has a greatly reduced concentration of carbon monoxide. For example, in a reactant stream 18 which entered the carbon monoxide clean-up system 10 with about 6% carbon monoxide, the reactant stream 18 may have a concentration of less than about 70 ppm carbon monoxide on exiting the carbon monoxide clean-up system 10. It will be understood that other carbon monoxide concentrations in the reactant stream 18 entering and exiting the carbon monoxide clean-up system are possible and are a matter of system design. It will be further understood that the carbon monoxide clean-up system 10 may produce a reactant stream 18 that may be used to feed a hydrogen fuel cell stack without the need for a partial oxidation or methanation unit, which may consume hydrogen. Additionally, the reactant stream 18 may be heated or cooled as needed prior to being provided to a fuel cell stack or the like.

Figure 2:
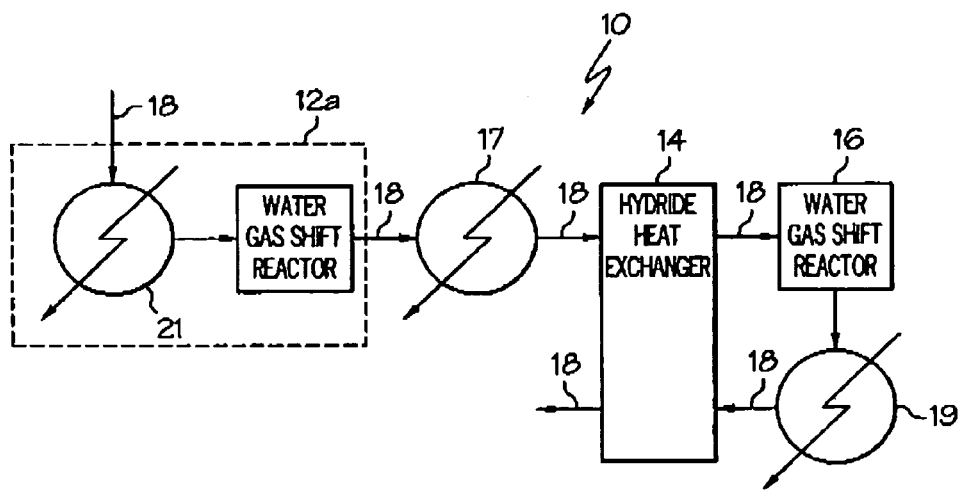
FIG. 2 is a schematic illustration of another carbon monoxide clean-up system in accordance with the present invention.

Referring to FIG. 2, a carbon monoxide clean-up system 10 in accordance with the present invention is illustrated. The carbon monoxide clean-up system 10 comprises a first water gas shift reactor 12*a* having a first water gas shift catalyst, a first hydride heat exchanger 14 having a first metal hydride, and a second water gas shift reactor having a second water gas shift catalyst 16 as discussed above. The first water gas shift reactor 12*a* is configured such that the reactant stream 18 is cooled while passing through the first water gas shift reactor 12*a*. Thus, the first water gas shift reactor 12*a* is cooled. The first water gas shift reactor 12*a* may be cooled in any suitable manner. For example, the first water gas shift reactor 12*a* may be proximate to a heat exchanger 21.

The reactant stream 18 passes through the first water gas shift reactor 12*a*, and the concentration of carbon monoxide is reduced. When the first water gas shift reactor 12*a* is cooled, the concentration of carbon monoxide in the reactant stream 18 is reduced more than the concentration of carbon monoxide in a reactant stream 18 is reduced when it passes through an uncooled water gas shift reactor. The reactant stream 18 then passes through the first hydride heat exchanger 14, the second water gas shift reactor 16, and again through the first hydride heat exchanger 14 as discussed above. After passing through the carbon monoxide clean-up system 10, the overall carbon monoxide concentration in the reactant stream 18 is lower than in a similar system with an uncooled first water gas shift reactor. For example, the concentration of carbon monoxide in a reactant stream 18 may be reduced from about 6% to about 53 ppm after passing through the carbon monoxide clean-up system 10 illustrated in FIG. 2.

Figure 3:
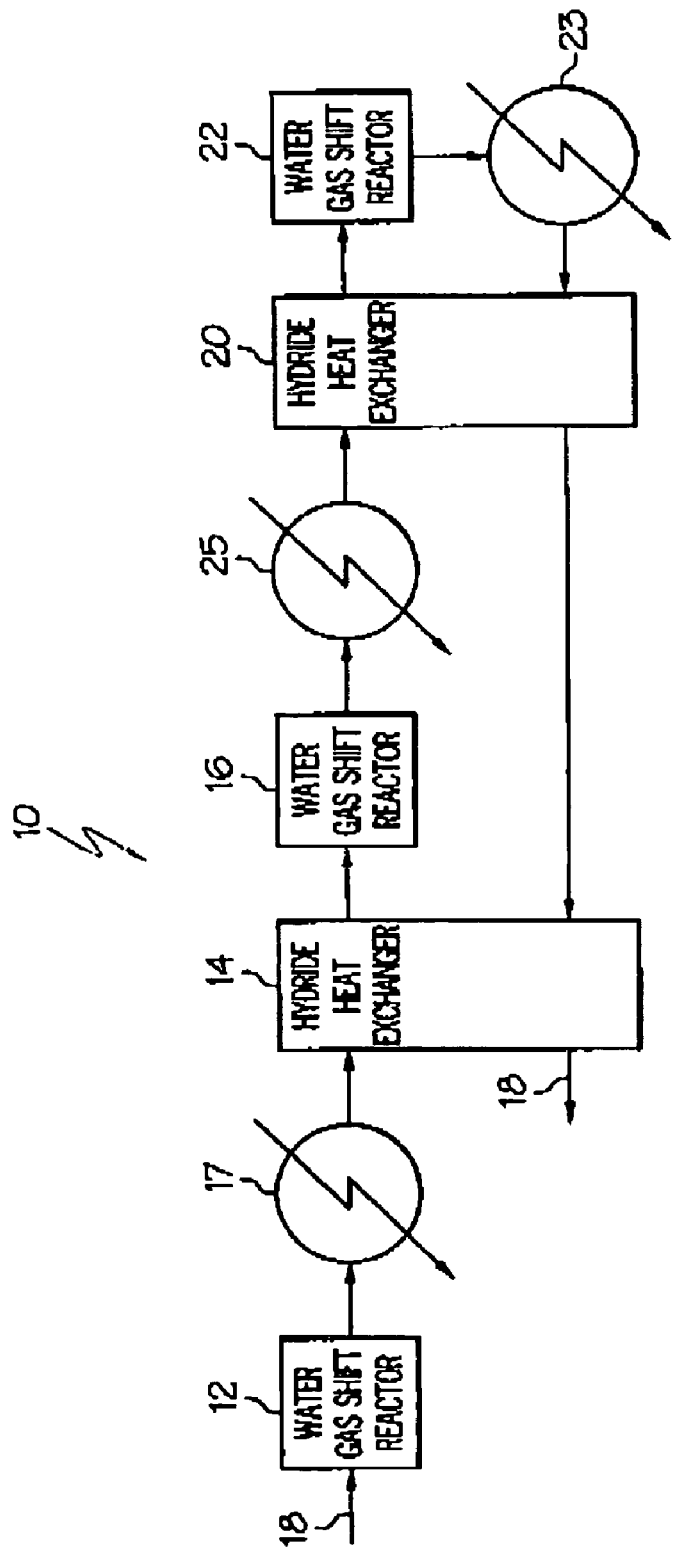
FIG. 3 is a schematic illustration of yet another carbon monoxide clean-up system in accordance with the present invention.

Referring to FIG. 3, a carbon monoxide clean-up system 10 in accordance with an embodiment of present invention is illustrated. The carbon monoxide clean-up system 10 comprises a first water gas shift reactor 12, a first hydride heat exchanger 14, a second water gas shift reactor 16, a second hydride heat exchanger 20, and a third water gas shift reactor 22. A reactant stream 18 comprising carbon monoxide and hydrogen is provided to the carbon monoxide clean-up system 10 and passes therethrough.

The first, second, and third water gas shift reactors 12, 16, 22 are any suitable water gas shift reactors having first, second, or third water gas shift catalysts, respectively. The first, second, and third water gas shift catalysts may be the same catalyst or different catalysts. Additionally, the first, second, and third water gas shift reactors 12, 16, 22 may each have more than one water gas shift catalyst. The first and second hydride heat exchangers 14, 20 are any suitable heat exchangers having a first or second metal hydride disposed therein, respectively. The first and second metal hydrides may be the same or different. Additionally, the first and second hydride heat exchangers 14, 20 may each have more than one metal hydride disposed therein. The first, second, and third water gas shift catalysts are generally selected such that an operational temperature of the first, second, or third water gas shift catalysts and a hydridable temperature of the first or second metal hydrides are approximately equal.

The reactant stream 18 passes through the first water gas shift reactor 12, and the concentration of carbon monoxide in the reactant stream 18 is reduced as described herein. The reactant stream 18 then passes through the first hydride heat exchanger 14, and hydrogen is absorbed by the first metal hydride. As described herein, the first metal hydride is selected such that hydrogen is absorbed at the temperature and partial pressure of hydrogen of the reactant stream 18 after the reactant stream 18 passes through the first water gas shift reactor 14. The reactant stream 18 may be cooled after passing through the first water gas shift reactor 12 and prior to passing through the first hydride heat exchanger 14. For example, the reactant stream 18 may be cooled by a heat exchanger 17.

The reactant stream 18 passes through the second water gas shift reactor 16 subsequent to passing through the first hydride heat exchanger 14, and the concentration of carbon monoxide in the reactant stream 18 is reduced as discussed herein. The reactant stream 18 is then passed through the second hydride heat exchanger 20 such that the concentration of hydrogen in the reactant stream 18 is reduced as the second metal hydride becomes hydrided. The second metal hydride is selected such that hydrogen is absorbed at the temperature and partial pressure of hydrogen of the reactant stream 18 after the reactant stream 18 passes through the second water gas shift reactor 14. The reactant stream 18 may be cooled after passing through the second water gas shift reactor 16 and prior to passing through the second hydride heat exchanger 16. For example, the reactant stream 18 may be cooled by a heat exchanger 25.

The reactant stream 18 passes through the third water gas shift reactor 22 after passing through the second hydride heat exchanger 20, and the concentration of carbon monoxide in the reactant stream 18 is reduced as described herein. The reactant stream 18 is then again passed through the second hydride heat exchanger 20, and the second metal hydride in the second hydride heat exchanger 20 becomes dehydrided such that the concentration of hydrogen in the reactant stream is increased. A heat exchanger 23 may heat the reactant stream 18 prior to entering the second hydride heat exchanger 20 after exiting the third water gas shift reactor 22 in order to increase the rate at which the second metal hydride is dehydrided.

Once the reactant stream 18 is again passed through the second hydride heat exchanger 20, it passes through the first hydride heat exchanger 14. The metal hydride in the first hydride heat exchanger 14 is dehydrided as described herein, and the concentration of hydrogen in the reactant stream 18 is further increased. The carbon monoxide clean-up system 10 illustrated in FIG. 3 may provide an extremely low concentration of carbon monoxide in the reactant stream 18 after the reactant stream 18 passes therethrough. For example, for a reactant stream 18 having a 6.0% carbon monoxide concentration upon entering the carbon monoxide clean-up system 10, the concentration of carbon monoxide in the reactant stream 18 upon exiting the carbon monoxide clean-up system 10 may be less than about 50 ppm.

Figure 4:
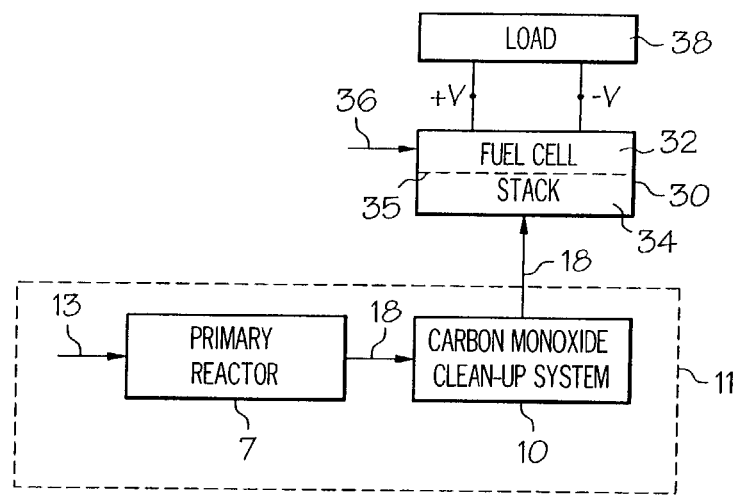
FIG. 4 is schematic illustration of a fuel cell system in accordance with the present invention.

Referring to FIG. 4, an exemplary fuel cell system including a carbon monoxide clean-up system 10 is illustrated. The fuel cell system comprises a fuel processing system 11 with a primary reactor 7 and a carbon monoxide clean-up system 10. The fuel processing system 11 provides the fuel cell stack 30 with a source of hydrogen. In the primary reactor 10, a reactant mixture 13 that may contain a hydrocarbon fuel stream and an oxygen-containing stream is flowed into the primary reactor 7. The oxygen-containing stream may comprise air, steam, and combinations thereof. The reactant mixture 13 may be formed by mixing a hydrocarbon fuel with a preheated air and steam input stream before flowing the reactant mixture into the primary reactor. After the reactant mixture 13 is flowed into the primary reactor 7, the reactant mixture 13 passes over at least one reaction zone having at least one reforming catalyst and product gas stream 18 containing hydrogen and carbon monoxide is produced catalytically. The primary reactor 7 is generally an autothermal reactor in which hydrogen is produced by combined catalytic partial oxidation and steam reforming reactions, but may alternatively comprise any suitable reactor configuration.

In one embodiment, the product gas stream 18 exiting the primary reactor 7 may comprise hydrogen, carbon dioxide, carbon monoxide, and trace compounds, and water in the form of steam. The product gas stream then passes through a carbon monoxide clean-up system 10 as described herein, and the concentration of carbon monoxide in the product gas stream 18 is reduced.

The product gas stream 18 exiting the carbon monoxide clean-up system is then fed into a fuel cell stack 30. As used herein, the term fuel cell stack refers to one or more fuel cells to form an electrochemical energy converter. As is illustrated schematically in FIG. 4, the electrochemical energy converter may have an anode side 34 and a cathode side 32 separated by diffusion barrier layer 35. The carbon monoxide purged product stream 24' is fed into the anode side 34 of the fuel cell stack 30. An oxidant stream 36 is fed into the cathode side 32. The hydrogen from the carbon monoxide purged product stream 24' and the oxygen from the oxidant stream 36 react in the fuel cell stack 30 to produce electricity for powering a load 38. A variety of alternative fuel cell designs are contemplated be present invention including designs that include a plurality of anodes 34, a plurality of cathodes 32, or any configuration where hydrogen is utilized in the production of electricity.

Figure 5:
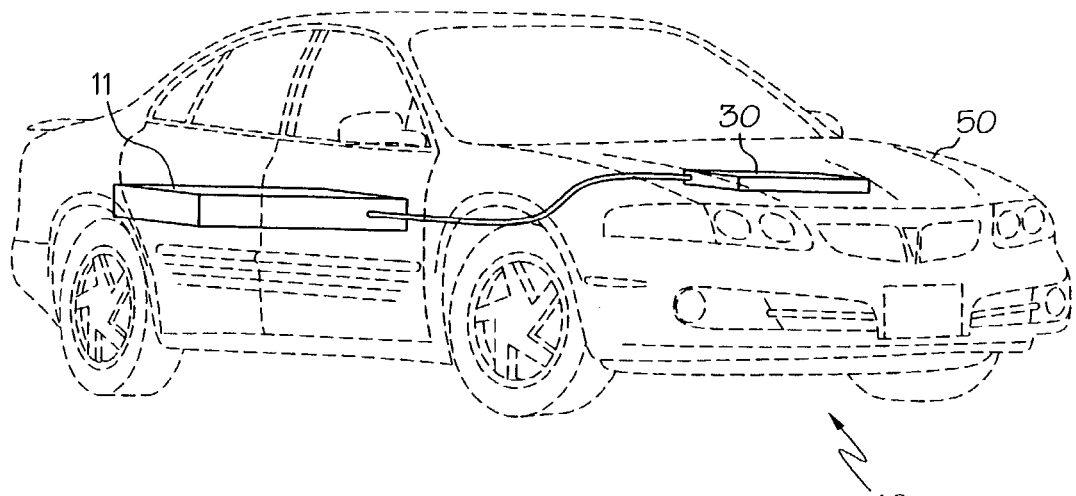
FIG. 5 is a schematic illustration of a vehicle having a fuel processing system and an electrochemical reaction cell in accordance with the present invention.

Referring to FIG. 5, the device of the present invention may be a vehicle 48 and the vehicle may have a vehicle body 50 and an electrochemical catalytic reaction cell comprising a fuel cell 30. The fuel cell 13 may be configured to at least partially provide the vehicle body with motive power. The vehicle 48 may also have a fuel processing system 30 to supply the fuel cell 13 with hydrogen, and the fuel processing system may include a carbon monoxide clean-up system as illustrated in FIG. 4. It will be understood by those having skill in the art that fuel cell 13 and fuel processing system 30 are shown schematically and may be used or placed in any suitable manner within the vehicle body 50.

It will be obvious to those skilled in the art that various changes may be made without departing from the scope of the invention, which is not to be considered limited to what is described in the specification.

What is claimed is:

1. A fuel cell system comprising a fuel cell stack and a carbon monoxide clean-up system in communication with the fuel cell stack, said carbon monoxide clean-up system comprising:
   a cooled first water gas shift reactor having a first water gas shift catalyst;
   a first hydride heat exchanger having a first metal hydride disposed therein, wherein said first hydride heat exchanger is in communication with said first water gas shift reactor, and wherein said first hydride heat exchanger is disposed such that a reactant stream may pass through said first water gas shift reactor prior to passing through said first heat exchanger; and
   a second water gas shift reactor having a second water gas shift catalyst, wherein said second water gas shift reactor is in communication with said first heat exchanger, and wherein said second water gas shift reactor is disposed such that said reactant stream may pass through said second water gas shift reactor after passing through said first heat exchanger,
   wherein the carbon monoxide clean-up system is disposed such that said reactant stream passes through and exits the carbon monoxide clean-up system and passes through said fuel cell stack without passing through partial oxidation or methanation units, and is configured such that said reactant stream passes through said first hydride heat exchanger after passing through said second water gas shift reactor.

2. The fuel cell system as claimed in claim 1 wherein said first water gas shift reactor has more than one water gas shift catalyst.

3. The fuel cell system as claimed in claim 1 wherein said first hydride heat exchanger has more than one metal hydride disposed therein.

4. The fuel cell system as claimed in claim 1 wherein said second water gas shift reactor has more than one water gas shift catalyst.

5. The fuel cell system as claimed in claim 1 wherein said first metal hydride is selected from metal hydrides containing Ti, Mg, Pd, and combinations thereof.

6. The fuel cell system as claimed in claim 1 wherein said first metal hydride is selected from metal hydrides of the $Mg_2Ni$ family.

7. The fuel cell system as claimed in claim 1 wherein said first metal hydride comprises a platinum group metal doped metal hydride.

8. The fuel cell system as claimed in claim 1 wherein said first water gas shift catalyst comprises a Cu—Zn—Al based catalyst.

9. The fuel cell system as claimed in claim 1 wherein said first water gas shift catalyst comprises a Pt/Ce based catalyst.

10. The fuel cell system as claimed in claim 1 wherein said second water gas shift catalyst comprises a Cu—Zn—Al based catalyst.

11. The fuel cell system as claimed in claim 1 wherein said second water gas shift catalyst comprises a Pt/Ce based catalyst.

12. The fuel cell system as claimed in claim 1 wherein said first water gas shift catalyst is selected such that an operational temperature of said first water gas shift catalyst and a hydridable temperature of said first metal hydride are approximately equal.

13. The fuel cell system as claimed in claim 1 wherein said second water gas shift catalyst is selected such that an operational temperature of said second water gas shift catalyst and a hydridable temperature of said first metal hydride are approximately equal.

14. The fuel cell system as claimed in claim 1 wherein said first water gas shift catalyst is selected such that an operational temperature of said first water gas shift catalyst and a hydridable temperature of said first metal hydride are approximately equal, and wherein said second water gas shift catalyst is selected such that an operational temperature of said second water gas shift catalyst and a hydridable temperature of said first metal hydride are approximately equal.

15. The fuel cell system as claimed in claim 1 wherein said carbon monoxide clean-up system further comprises:
   a second hydride heat exchanger having a second metal hydride disposed therein, wherein said second hydride heat exchanger is communication with said second water gas shift reactor, and wherein said second hydride heat exchanger is disposed such that a reactant stream may pass through said second hydride heat exchanger after passing through said second water gas shift reactor, and
   a third water gas shift reactor having a third water gas shift catalyst, wherein said third water gas shift reactor is in communication with said second hydride heat exchanger, and wherein said third water gas shift reactor is disposed such that a reactant stream may pass through said third water gas shift reactor after passing through said second hydride heat exchanger.

16. The fuel cell system as claimed in claim 15 wherein said carbon monoxide cleanup system is configured such that said reactant stream passes through said second hydride heat exchanger after passing through said third water gas shift reactor, and wherein carbon monoxide cleanup system is configured such that said reactant stream passes through said first hydride heat exchanger after passing through said second hydride heat exchanger.

17. The fuel cell system as claimed in claim 15 wherein said second water gas shift catalyst is selected such that an operational temperature of said second water gas shift catalyst and a hydridable temperature of said first metal hydride are approximately equal.

18. The fuel cell system as claimed in claim 15 wherein said third water gas shift catalyst is selected such that an operational temperature of said third water gas shift catalyst and a hydridable temperature of said first metal hydride are approximately equal.

19. The fuel cell system as claimed in claim 15 wherein said first water gas shift catalyst is selected such that an operational temperature of said first water gas shift catalyst and a hydridable temperature of said second metal hydride are approximately equal.

20. The fuel cell system as claimed in claim 15 wherein said second water gas shift catalyst is selected such that an operational temperature of said second water gas shift catalyst and a hydridable temperature of said second metal hydride are approximately equal.

21. The fuel cell system as claimed in claim 15 wherein said third water gas shift catalyst is selected such that an operational temperature of said third water gas shift catalyst and a hydridable temperature of said second metal hydride are approximately equal.

22. The fuel cell system as claimed in claim 1 further comprising a primary reactor disposed to provide a reactant stream comprising hydrogen and carbon monoxide to said carbon monoxide clean-up system.

23. A vehicle comprising the fuel cell system as claimed in claim 1 wherein said vehicle comprises:
   a vehicle body provided with motive power by said fuel cell stack; and
   a primary reactor disposed to provide a reactant stream comprising hydrogen and carbon monoxide to said carbon monoxide clean-up system.

24. The fuel cell system as claimed in claim 1 wherein said first water gas shift reactor is a cooled water gas shift reactor.

* * * * *

UNITED STATES PATENT AND TRADEMARK OFFICE
CERTIFICATE OF CORRECTION

| | | |
|---|---|---|
| PATENT NO. | : 7,160,343 B2 | |
| APPLICATION NO. | : 10/440020 | |
| DATED | : January 9, 2007 | |
| INVENTOR(S) | : Rowe et al. | |

It is certified that error appears in the above-identified patent and that said Letters Patent is hereby corrected as shown below:

Col. 9, line 42 "is communication" should read --is in communication--; and
Col. 9, line 47 "reactor, and" should read --reactor; and--

Signed and Sealed this

Fifth Day of June, 2007

JON W. DUDAS
*Director of the United States Patent and Trademark Office*